United States Patent
Doran et al.

(10) Patent No.: US 10,877,559 B2
(45) Date of Patent: Dec. 29, 2020

(54) SYSTEM TO PROVIDE TACTILE FEEDBACK DURING NON-CONTACT INTERACTION

(71) Applicant: Intel Corporation, Santa Clara, CA (US)

(72) Inventors: Kevin J. Doran, North Plains, OR (US); Stephen H. Hall, Forest Grove, OR (US); Murali Veeramoney, Beaverton, OR (US); Vijay M. Rao, Hillsboro, OR (US); Royce Fernald, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 15/083,587

(22) Filed: Mar. 29, 2016

(65) Prior Publication Data

US 2017/0285745 A1    Oct. 5, 2017

(51) Int. Cl.
  *G06F 3/041*    (2006.01)
  *G06F 3/0488*   (2013.01)
  *G06F 3/01*     (2006.01)

(52) U.S. Cl.
  CPC .......... *G06F 3/016* (2013.01); *G06F 3/0416* (2013.01); *G06F 3/04883* (2013.01); *G06F 2203/014* (2013.01); *G06F 2203/04108* (2013.01)

(58) Field of Classification Search
  CPC . G06F 3/01; G06F 3/011; G06F 3/014; G06F 3/016; G06F 3/017;
(Continued)

(56) References Cited

U.S. PATENT DOCUMENTS

2009/0183125 A1    7/2009  Magal et al.
2009/0187374 A1    7/2009  Baxter et al.
(Continued)

FOREIGN PATENT DOCUMENTS

WO    2016-007920 A1    1/2016

OTHER PUBLICATIONS

International Search Report and Written Opinion issued in PCT Application No. PCT/US2017/015152, dated May 2, 2017, 14 pages.
(Continued)

*Primary Examiner* — Nathan Danielsen
(74) *Attorney, Agent, or Firm* — Schiff Hardin LLP

(57) ABSTRACT

This disclosure is directed to a system to provide tactile feedback during non-contact interaction. A system may comprise at least display circuitry, sensing circuitry, tactile feedback circuitry and processing circuitry. The processing circuitry may cause the display circuitry to present a user interface. The sensing circuitry may sense when a body part of a user (e.g., a hand, a finger, etc.) is proximate to the user interface and may generate position data based on a sensed position of the body part. The processing circuitry may determine a relative position of the body part with respect to the user interface based on the position data, and may determine if the body part is interacting with the user interface based on the relative position. If it is determined that the body part is interacting with the user interface, the processing circuitry may cause the tactile feedback circuitry to generate directional feedback.

18 Claims, 5 Drawing Sheets

(58) Field of Classification Search
CPC ......... G06F 3/0304–0325; G06F 3/041; G06F 3/0412; G06F 3/0416–041662; G06F 3/0488; G06F 3/04883; G06F 2203/014; G06F 2203/04101; G06F 2203/04108; G09G 3/002; G09G 3/003
See application file for complete search history.

(56) References Cited

U.S. PATENT DOCUMENTS

| | | | | |
|---|---|---|---|---|
| 2010/0302015 | A1* | 12/2010 | Kipman | G06F 3/016 345/419 |
| 2013/0009892 | A1* | 1/2013 | Salmela | G06F 3/016 345/173 |
| 2013/0120247 | A1* | 5/2013 | Imai | G06F 3/01 345/156 |
| 2014/0218300 | A1* | 8/2014 | Muraki | G06F 3/0482 345/168 |
| 2014/0237432 | A1 | 8/2014 | Geurts et al. | |
| 2015/0007025 | A1* | 1/2015 | Sassi | G06F 3/016 715/702 |
| 2015/0145656 | A1* | 5/2015 | Levesque | G06F 1/163 340/407.1 |
| 2015/0300993 | A1 | 10/2015 | Prest et al. | |

OTHER PUBLICATIONS

"Ultrahaptics. Gesture with confidence. Immediate tactile feedback for gesture interfaces", downloaded from http://ultrahaptics.com/ on Jul. 6, 2016.

\* cited by examiner

SYSTEM TO PROVIDE TACTILE FEEDBACK DURING NON-CONTACT INTERACTION

TECHNICAL FIELD

The present disclosure relates to user interface systems, and more particularly, to a user interface system to generate tactile feedback without a user having to contact a device surface.

BACKGROUND

In general, "user interfaces" may incorporate a variety of different technologies that may allow a user to interact with at least one device. Early computers employed a keyboard interface that was later accompanied by a pointing device like a "mouse" for facilitating "point and click" operation. Newer platforms such as mobile devices (e.g., smart phones), tablet computers, etc. rely on touch interfaces to facilitate user interaction. Touch interaction allows users to interact directly with a device by simply touching a display. As a result, separate physical controls such as physical keyboards, electromechanical controls for cursor control, etc. are no longer needed.

Emerging user interface technologies no longer require any physical contact between user and device. For example, sensors in a device may be able to track the position of a user, a user's body part (e.g., hand), etc., and processing resources within the device may be able to determine an intended command based on the sensor data. For example, a hand position with respect to the user interface, a motion made with the hand/arm (e.g., a gesture), etc. may be interpreted by the device as certain actions similar to those made with keyboard and mouse. While users may be able to interact with a device without having to make physical contact with the device, the non-contact nature of these user interfaces does not provide a way to determine if an input has been recognized, and/or recognized correctly, other than visually monitoring a user interface. Visual monitoring may be acceptable in many situations, but not for all situations such as, for example, when the user interface is visually obscured from the user, when the user is vision impaired, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
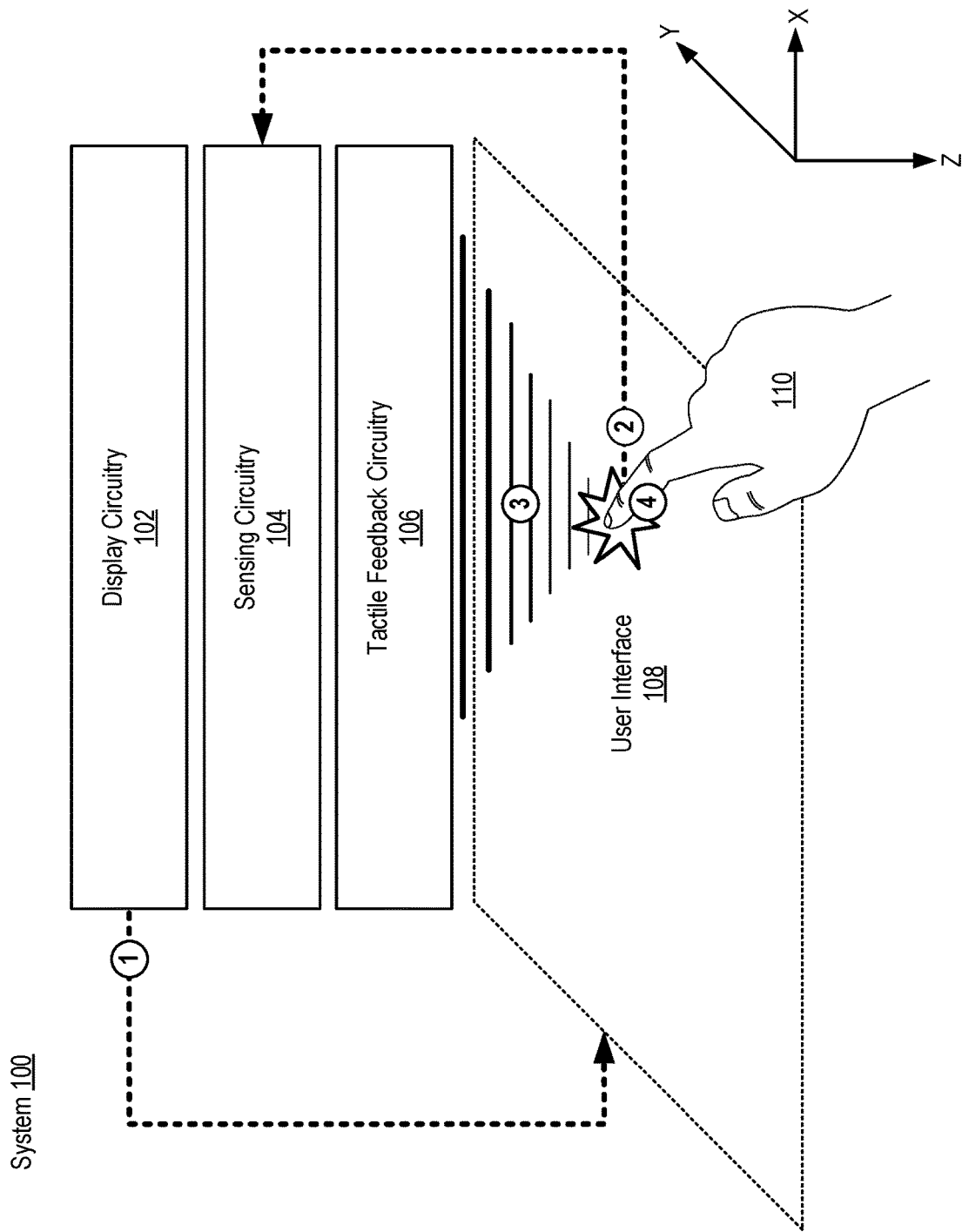
FIG. 1 illustrates an example of a system to provide tactile feedback during non-contact interaction in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a system to provide tactile feedback during non-contact interaction. A system may comprise at least display circuitry, sensing circuitry, tactile feedback circuitry and processing circuitry. The processing circuitry may cause the display circuitry to present a user interface. For example, the user interface may be visible on a display, projected onto a surface, etc. The sensing circuitry may sense when a body part of a user (e.g., a hand, a finger, etc.) is proximate to the user interface and may generate position data based on a sensed position of the body part. The processing circuitry may determine a relative position of the body part with respect to the user interface based on the position data, and may determine if the body part is interacting with the user interface based on the relative position. If it is determined that the body part is interacting with the user interface, the processing circuitry may cause the tactile feedback circuitry to generate directional feedback. Example directional feedback may include a steerable ultrasonic beam directed to the position of the body part. The intensity and/or type of the beam may be variable and configured to convey different situational conditions to the user.

In at least one embodiment, a device for non-contact user interaction may comprise, for example, at least user interface circuitry and processing circuitry. The user interface circuitry may comprise at least display circuitry to present a user interface, sensing circuitry to detect a body part of a user and generate position data based on a sensed position of the body part and tactile feedback circuitry to generate directional feedback. The processing circuitry may be to at least cause the display circuitry to present the user interface, determine a position of the body part relative to the user interface based on the position data, determine when the body part is interacting with the user interface based on the relative position of the body part and cause the tactile feedback circuitry to generate the directional feedback based on a determination that the body part is interacting with the user interface.

In at least one embodiment, the display circuitry may be to at least one of cause a display to present the user interface or cause a projector to project a user interface onto a surface. The sensing circuitry may be to determine coordinates for the body part in at least one of a coordinate system relative to the device or a fixed coordinate system. The tactile feedback circuitry may be to generate a steerable ultrasonic beam directed at the relative position of the body part.

In at least one embodiment, the tactile feedback circuitry may comprise at least signal source circuitry and ultrasonic transducer circuitry including at least one ultrasonic transducer. The signal source circuitry may be to generate a signal for driving the at least one ultrasonic transducer to generate the directional feedback. In one embodiment, the ultrasonic transducer circuitry may comprise a plurality of ultrasonic transducers arranged in an array. For example, the ultrasonic transducer circuitry may comprise a plurality of ultrasonic transducers arranged in a multidimensional array. The delay circuitry may be to, for one or more of the plurality of ultrasonic transducers, control an amount of delay introduced into the driving signal.

In at least one embodiment, the processing circuitry is further to determine at least one of an intensity for the direction feedback or a type of for the directional feedback. The types of directional feedback may include, for example, at least constant feedback and pulsed feedback. Consistent with the present disclosure, an example method for non-contact user interaction with at least one device may comprise presenting a user interface, detecting a body part of a user, generating position data based on a sensed position of the body part, determining a position of the body part relative to the user interface based on the position data, determining when the body part is interacting with the user interface based on the relative position of the body part and causing the tactile feedback circuitry to generate the directional feedback based on a determination that the body part is interacting with the user interface.

FIG. 1 illustrates an example of a system to provide tactile feedback during non-contact interaction in accordance with at least one embodiment of the present disclosure. The following may make reference to, or may use terminology commonly associated with, certain technologies for sensing comprising, but not limited to, proximity detection and position determination using visual/depth sensing technology such as RealSense™ from the Intel Corporation, ultrasonic beam generation and steering, etc. These examples are provided for the sake of explanation, and are not intended to limit any of the various embodiments consistent with the present disclosure to any particular manner of implementation. While the above example technologies may provide a basis for understanding the various embodiments, actual implementations may utilize alternative technologies existing now or developed in the future. Moreover, the inclusion of an apostrophe after a drawing item number (e.g., 100') in the present disclosure may indicate that an example embodiment of the particular item is being illustrated merely for the sake of explanation herein.

As referenced herein, "non-contact interaction" may include user interaction with at least one device without the user actually making contact with the device. Embodiments consistent with the present disclosure may facilitate non-contact interaction by, for example, sensing a body part of a user proximate to a presentation of a user interface by at least one device, and may then interpret a position, an orientation, an activity (e.g., a gesture) of the user body part as an input to the at least one device. A body part may include any portion of a user's body, but may typically include an appendage of a person such as an arm, finger, leg, toe, etc. For example, some users may be disabled in that they may have non-operative appendages, may be missing appendages, etc., and may instead utilize a remaining appendage such as a leg/toe to interact with the at least one device. Moreover, users may with other disabilities such as vision impairment may be able to benefit from embodiments consistent with the present disclosure in that user interaction may be acknowledged through tactile feedback along with, or as an alternative to, visual feedback. The tactile feedback is felt by a user without actually making contact with the at least one device since energy (e.g., an ultrasonic beam) transmitted over free space causes the tactile feedback.

FIG. 1 illustrates example system 100. System 100 may comprise one device or multiple devices configured to operate collaboratively. Example devices that are usable with system 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen OS™ from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, server, a group of computing devices in a high performance computing (HPC) architecture, a smart television or other "smart" device, small form factor computing solutions (e.g., for space-limited applications, TV set-top boxes, etc.) like the Next Unit of Computing (NUC) platform from the Intel Corporation, etc.

System 100 may comprise at least display circuitry 102, sensing circuitry 104 and tactile feedback circuitry 106. Display circuitry 102 may be configured to "present" user interface 108. Presenting user interface 108 may comprise, for example, causing user interface 108 to be visibly displayed, projected, etc. Display circuitry 102 may be based on video presentation technologies comprising, for example, cathode ray tube (CRT), liquid crystal display (LCD), plasma display panel (PDP), light emitting diode (LED), active-matrix organic LED (AMOLED), retina display, etc. User interface 108 may comprise displayed content such as text, images, objects, folders, etc. to access (e.g., read, select, open, execute, move, delete, etc.) in system 100. In at least one example implementation, user interface 108 may be projected on a flat surface such as a desktop, tabletop, floor, etc.

A user may interact with user interface 108 by placing a body part such as hand 110 near to (e.g., proximate to, hovering over, etc.) an object with which the user desires to interact. The desired object may then be selected by hovering hand 110 over the object for a certain duration of time, moving hand 110 towards the object (e.g., along the z-axis as illustrated in FIG. 1), etc. The selection of an object in user interface 108 may be determined, at least in part, by sensing circuitry 104. Sensing circuitry 104 may comprise at least one sensor and related circuitry for generating position data. The at least one sensor may comprise include various technologies for determining the presence and/or position of hand 110. These technologies may include, but are not limited to, vision and/or depth capture technologies (e.g., such as an RGB/D camera based on RealSense™ technology), touch and/or proximity sensing technologies based on electronic (e.g., capacitive) or magnetic (e.g., Hall Effect) sensing, etc. Sensing circuitry 104 may be capable of determining when hand 110 is proximate to system 100 and/or user interface 108 and generating position data. The position data may be generated utilizing coordinates (e.g., X, Y and Z) based on a relative and/or absolute coordinate system. Example relative coordinate systems may be measured from a reference point on at least one device in system 100, a reference point in user interface 108, etc. Example absolute coordinate systems may be based on longitude and latitude, compass headings (e.g., North, East, South and West), an electronic navigational system such as the Global Positioning System (GPS), etc. In some instances the position of hand 110 may be determined based on an absolute coordinate system such as GPS, and that position may then be translated into a coordinate system relative to user interface 108 to, for example, determine at least one object that the user desires to access within user interface 108. Upon determining the object that the user desires to access, the desired object may then be selected and/or acted upon.

Selection of the object may then cause an activity to occur such as revealing the contents of a folder associated with the object, executing an application associated with the object, etc. System 100 may confirm selection of the object and/or activities performed involving the object visually on user interface 108 similar to the operation of conventional systems. However, consistent with the present disclosure, tactile feedback circuitry 106 may also confirm the selection of the object and/or related activity using "directional feedback." Directional feedback may be a form of non-contact interaction wherein system 100 may cause the user to feel an effect on their body (e.g., on hand 110) as a form of confirmation. In at least one embodiment, an ultrasonic beam may be generated that may be felt by the user. The ultrasonic beam may be steerable in that generation of the ultrasonic beam may be controlled so that its affect may only be felt over a small area that is selectable. In this manner, the ultrasonic beam may be directed to impact a user's finger, hand or other body part. Moreover, the beam may be steered to impact different body parts to signify different confirmations (e.g., for different files, different activities, as feedback for games, etc.) or may concurrently impact multiple body parts in the same way (e.g., with the same intensity, pulse pattern, etc.) or in different ways to, for example, confirm multi-body part interaction with a device such as a two-finger zoom. Intensity of the beam and/or type of beam (e.g., continuous or pulsed) may also be configured to represent different types of activities, transactions, etc.

FIG. 1 further illustrates an example of operation. As shown at ①, display circuitry 102 may initially present user interface 108. A user may place their hand (e.g., in a point gesture as shown at 110) in a certain location with respect to user interface 108 to interact with at least one object on user interface 108 (e.g., to select an object, move the object, delete the object, execute an application, etc.). Sensing circuitry 104 may sense the user's finger as shown at ② in FIG. 1 and may generate position data based on sensing hand 110. Processing circuitry in system 100 may determine a position of hand 110 relative to user interface 108 based on the position data, and may determine whether the relative position of hand 110 is indicative of user interactivity with user interface 108. If it is determined that the user is interacting with user interface 108, tactile feedback circuitry 106 may then generate directional feedback as shown at ③ in FIG. 1. In at least one embodiment, the intensity and/or type of feedback may be based on the type of interactivity. The user may then perceive the directional feedback as shown at ④ in FIG. 1. Depending on the type of directional feedback employed, the directional feedback may be perceived by the user as a pressure, a pulsed pressure, a vibration, a buzzing, a tingling, etc.

Figure 2:
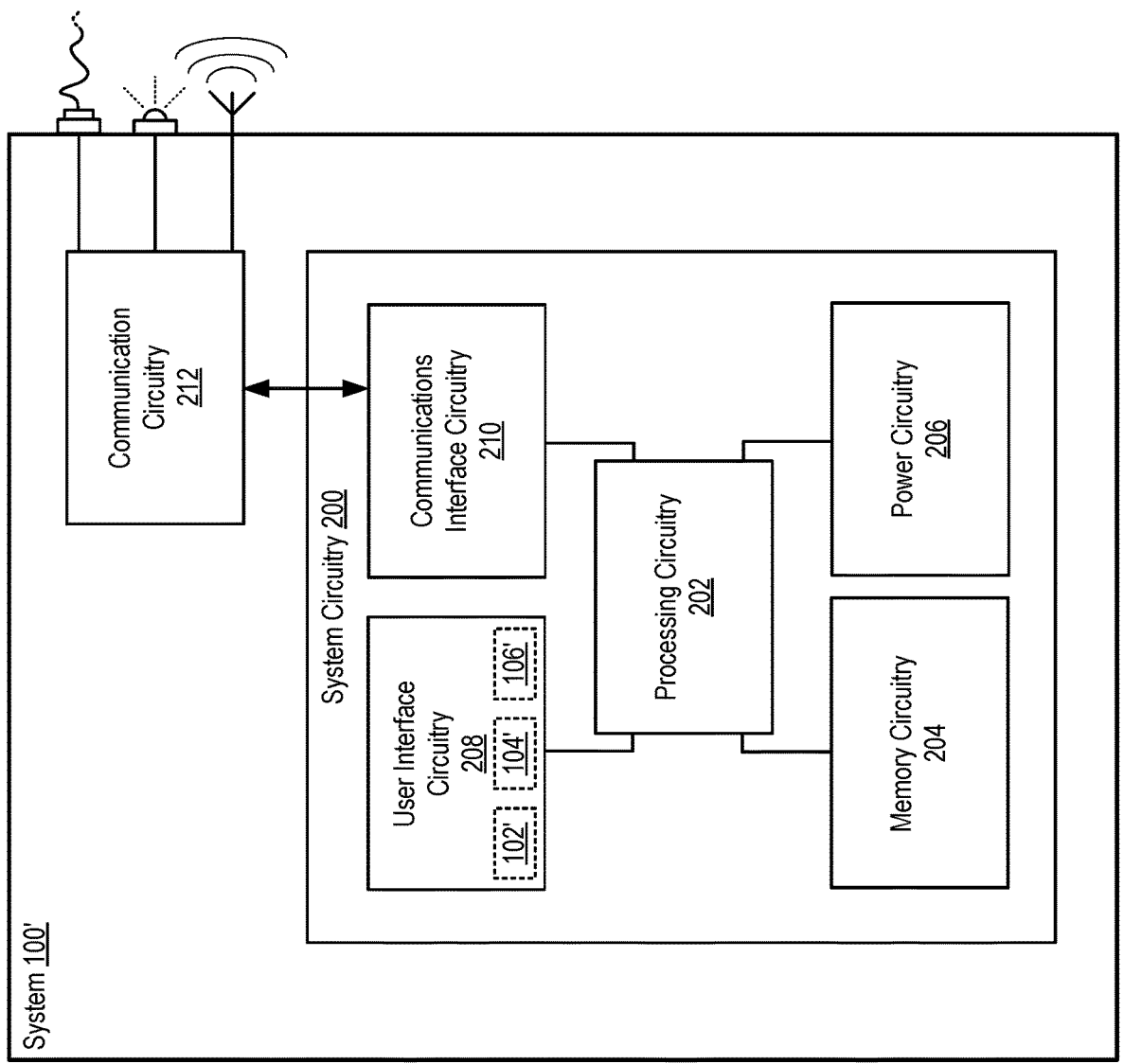
FIG. 2 illustrates an example configuration for a device usable in accordance with at least one embodiment of the present disclosure.

FIG. 2 illustrates an example configuration for a device usable in accordance with at least one embodiment of the present disclosure. System 100' may be capable of performing any or all of the activities described with respect to FIG. 1. However, system 100' is presented only as an example system that may be usable in embodiments consistent with the present disclosure, and is not intended to limit any embodiment disclosed herein to a particular manner of implementation. Moreover, while illustrated as only one apparatus in FIG. 2, system 100' may also be made up of multiple apparatuses (e.g., configured to operate collaboratively).

System circuitry 200 may manage the operation of system 100'. System circuitry 200 may comprise, for example, processing circuitry 202, memory circuitry 204, power circuitry 206, user interface circuitry 208 and communication interface circuitry 210. System 100' may also include communication circuitry 212. While communication circuitry 212 is shown as separate from system circuitry 200, system 100' has been provided in FIG. 2 merely for the sake of explanation in regard to various embodiments. Possible variations may include some or all of the functionality of communication circuitry 212 being incorporated into system circuitry 200.

In system 100', processing circuitry 202 may comprise one or more processors situated in separate components, or alternatively one or more processing cores in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium®, Xeon®, Itanium®, Celeron®, Atom®, Quark™, Core i-series, Core M-series product families, Advanced RISC (e.g., Reduced Instruction Set Computing) Machine or "ARM" processors, microcontrollers, programmable logic controllers (PLCs), etc. Examples of support circuitry may include chipsets (e.g., Northbridge, Southbridge, etc. available from the Intel Corporation) to provide an interface through which processing circuitry 202 may interact with other system components that may be operating at different speeds, on different buses, etc. in system 100'. Moreover, some or all of the functionality commonly associated with the support circuitry may also be included in the same package as the processor (e.g., such as in the Sandy Bridge, Broadwell and Skylake families of processors available from the Intel Corporation).

Processing circuitry 202 may be configured to execute various instructions in system 100'. Instructions may include program code configured to cause processing circuitry 202 to perform activities related to reading data, writing data, processing data, formulating data, converting data, transforming data, etc. Information (e.g., instructions, data, etc.) may be stored in memory circuitry 204. Memory circuitry 204 may comprise random access memory (RAM) and/or read-only memory (ROM) in a fixed or removable format. RAM may include volatile memory configured to hold information during the operation of system 100' such as, for example, static RAM (SRAM) or Dynamic RAM (DRAM). ROM may include non-volatile (NV) memory circuitry configured based on BIOS, UEFI, etc. to provide instructions when system 100' is activated, programmable memories such as electronic programmable ROMs (EPROMS), Flash, etc. Other examples of fixed/removable memory may include, but are not limited to, magnetic memories such as hard disk (HD) drives, electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Discs™, etc.

Power circuitry 206 may include, for example, internal power sources (e.g., a battery, fuel cell, etc.) and/or external power sources (e.g., electromechanical or solar generator, power grid, external fuel cell, etc.), and related circuitry configured to supply system 100' with the power needed to operate. User interface circuitry 208 may include hardware and/or software to allow users to interact with system 100' such as, for example, various input mechanisms (e.g., microphones, switches, buttons, knobs, keyboards, speakers, touch-sensitive surfaces, one or more sensors configured to capture images, video and/or sense proximity, distance, motion, gestures, orientation, biometric data, etc.) and various output mechanisms (e.g., speakers, displays, lighted/flashing indicators, electromechanical components for vibration, motion, etc.). Hardware in user interface circuitry 208 may be included in system 100' and/or may be coupled to system 100' via a wired or wireless communication medium.

Communication interface circuitry 210 may be configured to manage packet routing and other control functions for communication circuitry 212, which may include resources configured to support wired and/or wireless communications. In some instances, system 100' may comprise more than one set of communication circuitry 212 (e.g., including separate physical interface circuitry for wired protocols and/or wireless radios) managed by centralized communication interface circuitry 210. Wired communications may include serial and parallel wired mediums such as, for example, Ethernet, USB, FireWire®, Thunderbolt™, Digital Video Interface (DVI), High-Definition Multimedia Interface (HDMI), DisplayPort™, etc. Wireless communications may include, for example, close-proximity wireless mediums (e.g., radio frequency (RF) such as based on the RF Identification (RFID)or Near Field Communications (NFC) standards, infrared (IR), etc.), short-range wireless mediums (e.g., Bluetooth®, WLAN, Wi-Fi, etc.), long range wireless mediums (e.g., cellular wide-area radio communication technology, satellite-based communications, etc.), electronic communications via sound waves, long-range optical communications, etc. In one embodiment, communication interface circuitry 210 may be configured to prevent wireless communications that are active in communication circuitry 212 from interfering with each other. In performing this function, communication interface circuitry 210 may schedule activities for communication circuitry 212 based on, for example, the relative priority of messages awaiting transmission. While FIG. 2 illustrates communication interface circuitry 210 and communication circuitry 212 as separate, it may also be possible for the functionality of communication interface circuitry 210 and communication circuitry 212 to be combined in the same circuitry.

Consistent with the present disclosure, at least portions of display circuitry 102', sensing circuitry 104' and/or tactile feedback circuitry 106' may reside in user interface circuitry 208 as equipment (e.g., hardware) for use in presenting user interface 108, sensing the presence and/or position of hand 110, generating directional feedback, etc. In addition, portions of circuitry 102', 104' and 106', and/or resources for controlling circuitry 102', 104' and 106', may be software. In an example of operation, processing circuitry 202 may cause program files, code, data, etc. stored within NV memory in memory circuitry 204 to be loaded into volatile memory also in memory circuitry 204. The software loaded into the volatile memory may then be executed by processing circuitry 202 to transform processing circuitry 202 from generalized data processing circuitry (e.g., a general microprocessor) into specialized circuitry configured to at least perform operations such as discussed with respect to FIG. 1.

Figure 3:
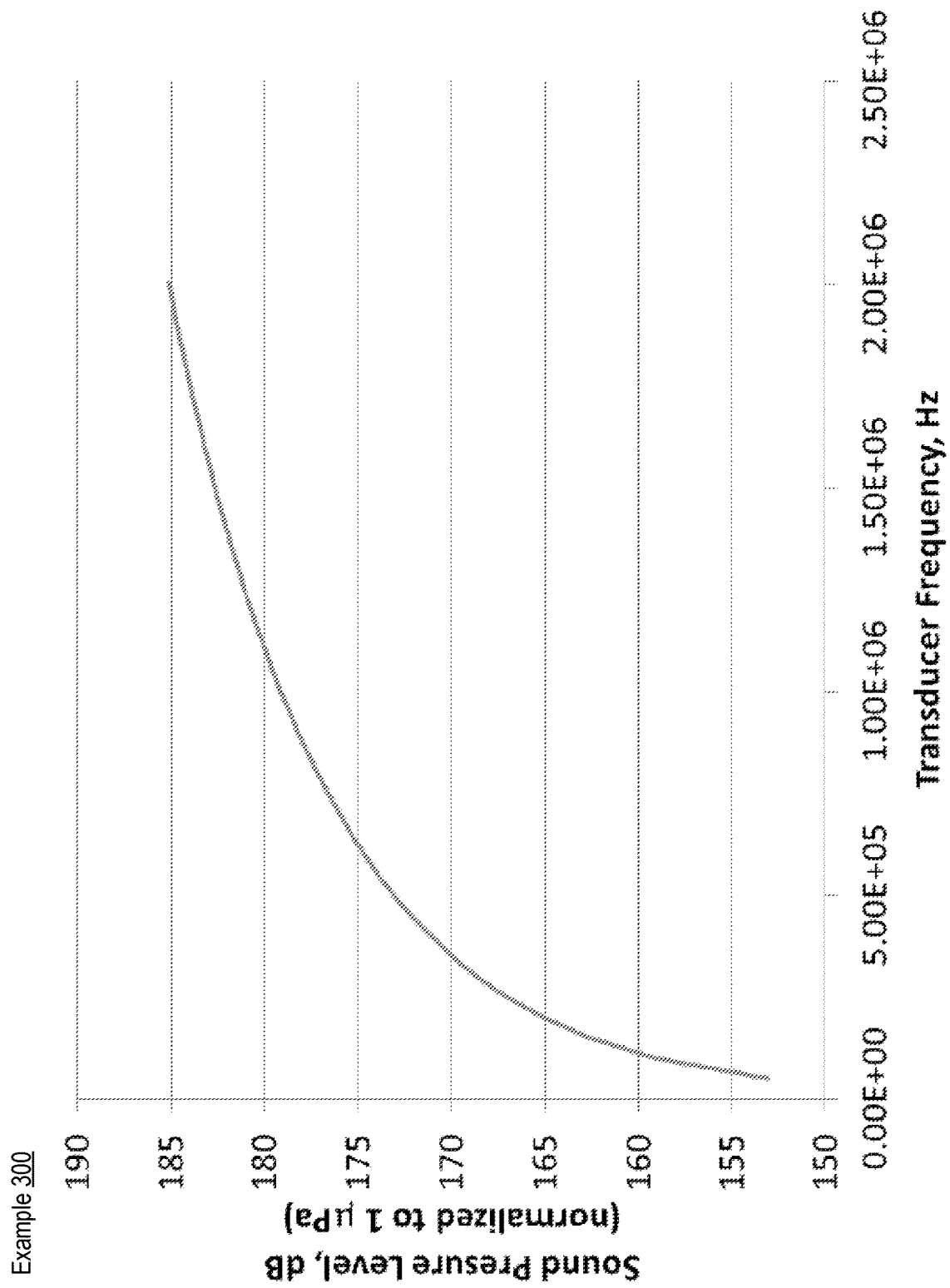
FIG. 3 illustrates an example sound pressure to transducer frequency relationship usable in accordance with at least one embodiment of the present disclosure.

FIG. 3 illustrates an example sound pressure to transducer frequency relationship usable in accordance with at least one embodiment of the present disclosure. Embodiments consistent with the present disclosure may employ sensing circuitry 104 comprising, for example, at least a RealSense™ camera to track hand 110 (e.g., at least a finger) relative to a projected Windows interface. For example, an algorithm may track the X-Y coordinates of the user's finger on the surface of the projected image and decode input controls such as tapping an icon, drawing a line or typing on a keyboard.

The user experience interacting with user interface 108 may be augmented using tactile feedback circuitry 106. In at least one example implementation, tactile feedback circuitry 106 may comprise an array of transducers in conjunction with the RealSense™ cameras to steer and focus an ultrasonic beam to the X-Y coordinates of the user's fingers to provide tactile feedback to issued commands. A phenomenon called ultrasonic "radiation pressure" may be harnessed to project a remote sense of "touch". Phased array beam steering and focusing techniques are used in conjunction with the coordinates provided by the RealSense™ camera system to interactively steer the ultrasonic beam towards the user's fingers and create a tactile perception as commands are input on the projected interface. The combination of a projected computing system and an ultrasonic steerable tactile feedback mechanism will provide a unique interface and an enhanced user experience.

"Touch" perception may be generated by focusing ultrasonic wave propagation. All forms of wave motion, including ultrasonic sound waves, exert a unidirectional radiation force on obstacles in their path. This radiation force can be transmitted over free space, to project a sense of touch using common ultrasonic transducers. The radiation force F exerted on a human finger by an ultrasonic beam of acoustic power level W is given by equation (1):

$$F = M\frac{W}{c} \tag{1}$$

wherein c is the speed of sound in a medium surrounding a target and M is a number that may range between 1 for a perfectly absorbing material and 2 for a perfectly reflecting material. For air, c=343 m/s and M is approximately 2 for human skin. It has been empirically determined that a minimum perceptible acoustic radiation force on a human finger is 0.4 mN. To transmit tactile feedback through free-space, a minimum acoustic power level $W_{min}$ is needed, as shown in equation (2):

$$0.4 \times 10^{-3} N = 2\frac{W_{min}}{343 \text{ m/s}} \rightarrow W_{min} = 68.6 \times 10^{-3} \text{ Watts} \tag{2}$$

The approximate acoustic power from a circular ultrasonic transducer having an area A transmitted along the +z axis may be calculated utilizing equation (3):

$$W = \frac{p^2\lambda^2 r^2}{2\pi\rho c b^2} \text{Watts} \tag{3}$$

wherein ρ is the density of the propagating medium (e.g., air), λ is the wavelength of the acoustic wave, r is the distance between the target and the transducer surface, b is the radius of the transducer and p is the sound pressure level. To ensure perception of acoustic radiation force transmitted through air at the target (e.g., at hand 110), a transducer must have a sufficient sound pressure level p to produce the minimum acoustic power for human perception as described by equation (2). Rearranging (3) to solve for the sound pressure level, p yields (4).

$$p^2 = \frac{2\pi W_{min} \rho_{air} c_{air} b^2}{\lambda^2 r^2} \quad (4)$$

Equation (4) describes the minimum performance (sound pressure level) of a circular transducer needed to produce an acoustical radiation force that is perceptible to hand 110. Modulation of the ultrasonic beam may be used to enhance the perception, produce different levels of sensation and customize the tactile response to specific user inputs. Assuming $\rho_{air}$=1.225 kg/m³, $c_{air}$=343 m/s, b=0.0254 m, r=0.3 m and a single ultrasonic transducer with a diameter of 0.5 in as the signal generator, the minimum power level required for the human finger to perceive at approximately 10 in (0.3 m) is illustrated in FIG. 3 by example chart 300.

"Off-the-shelf" ultrasonic transducers may exhibit sound pressure levels (SPL) ranging from 180 dB (e.g., for imaging transducers) to 110-120 dB (e.g., for small, low cost distance sensing applications). In an example implementation where off-the-shelf ultrasonic transducers each exhibit an SPL level of 120 dB, a 1-D array of 45 50-KHz transducers may be employed to meet the minimum requirements demonstrated by example chart 300 in FIG. 3. The number of transducers may be reduced for SPL's greater than 120 dB, but higher numbers of transducers in the array may result in better beam steering granularity. The size of an array utilizing commonly available, low cost transducers is estimated to be 22.5 in long by ½ in high, which may allow for implementation of tactile feedback circuitry 106' within the form factor of existing devices such as, for example, a CPU unit of a projection computer device. Specialized transducers may be designed to facilitate usage models for smaller or larger devices with varying performance levels.

Figure 4:
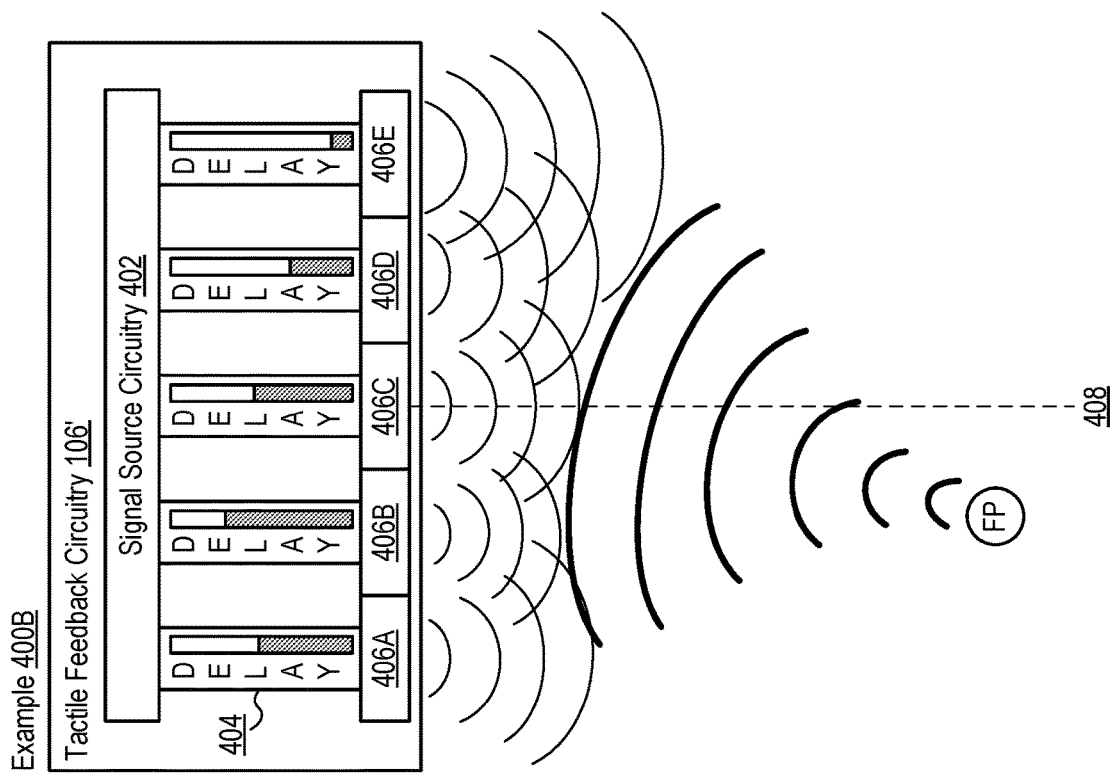
FIG. 4 illustrates example of generating directional feedback in accordance with at least one embodiment of the present disclosure.
Figure 4:
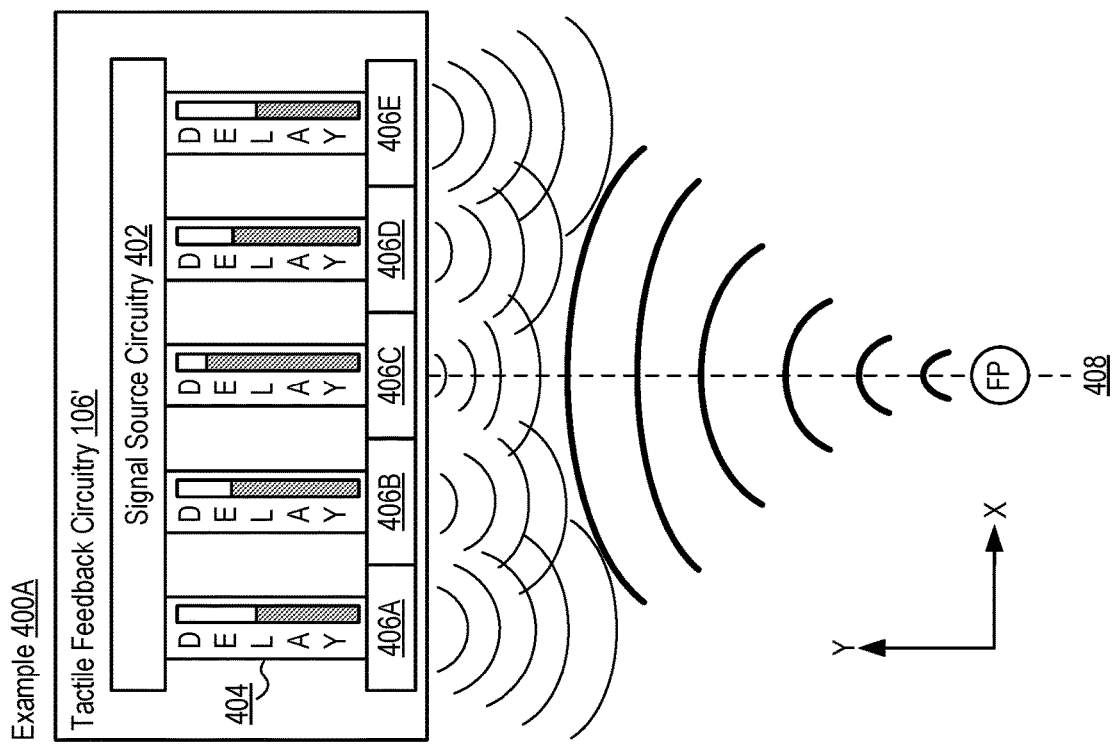

FIG. 4 illustrates example of generating directional feedback in accordance with at least one embodiment of the present disclosure. As illustrated in examples 400A and 400B, tactile feedback circuitry 106' may include, for example, signal source circuitry 402, delay circuitry 404 and ultrasonic transducers 406A, 406B, 406C, 406D, 406E (collectively, "transducers 406A-E"). While five transducers are shown, the number of transducers used in actual implementations may be larger or smaller depending on the nature of the implementation, cost, desired granularity, etc. In at least one embodiment, signal source circuitry 402 may generate a signal to drive transducers 406A-E. Delay circuitry 404 may variably adjust the phase of or "delay" (e.g., based on control provided by processing circuitry 202) the driving signal generated by signal source circuitry 402. In at least one embodiment, delay circuitry 404 may adjust the amount of delay for each transducer 406A-E individually. Delaying the driving signal for one or more transducers 406-E may allow the resulting ultrasonic beam to be steered in a direction based on, for example, the determined position of hand 110.

As shown in example 400A, adding more delay to the center of the array (e.g., transducer 406C) and reduced delay towards the outside of the array (e.g., transducers 406A and 406E) may generate a directed ultrasonic beam along a central axis 408 (e.g., z axis) towards a focal point (FP). Example 400B shows how altering how delay is applied to transceivers 406A-E may alter the direction of the resulting ultrasonic beam. The largest delay may be seen in transceiver 406B with slightly reduced delays in transceivers 406A and 406C and substantially reduced delays in transceivers 406D and 406E. The resulting ultrasonic beam is steered off of the central axis to a new FP. A multidimensional array of transducers 406A-E may allow the ultrasonic beam to be directed to a FP within a larger target area. While FIG. 4 demonstrates beam steering in a two-dimensional plane (e.g., horizontally within the X-Y plane as illustrated in FIG. 4), the array of transducers 406A-E may also be arranged in two dimensions with two or more stacked layers of transducers 406A-E. A two-dimensional array may allow the ultrasonic beam may be steered in three dimensions (e.g., both horizontally and vertically). The array of transducers 406A-E may also be arranged in three dimensions such as, for example, in a spherical array (e.g., to direct an ultrasonic beam anywhere within a room). The granularity of beam steering and the FP may be dependent on, for example, the number of transducers 406A-E, spacing, frequency, etc. In at least one embodiment, the amplitude levels of transducers 406A-E may also be modified alone or in combination with the delay to influence beam steering direction, responsiveness, etc. The intensity and/or type of beam (e.g., constant or pulsed) may also be varied to convey different types of confirmations to the user such as, but not limited to, command recognized, command not recognized, command completed, object selected, object deleted, application starting, etc.

Figure 5:
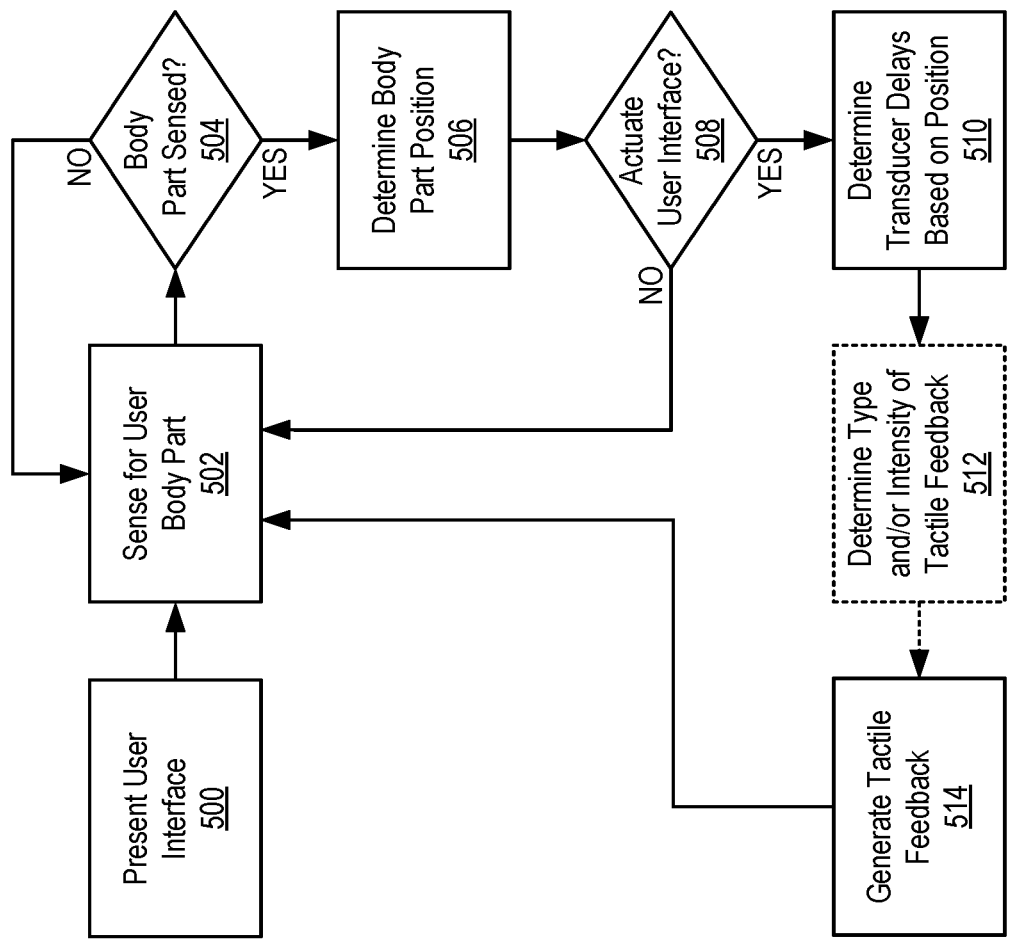
FIG. 5 illustrates example operations for providing tactile feedback during non-contact interaction in accordance with at least one embodiment of the present disclosure.

FIG. 5 illustrates example operations for providing tactile feedback during non-contact interaction in accordance with at least one embodiment of the present disclosure. In operation 500 a user interface may be presented by a system. The user interface may be presented on a display within, or at least coupled to, the system, projected by the system on a flat surface, etc. Following the presentation of the user interface, sensing may be initiated in operation 502 to detect a body part of a user. For example, sensing circuitry in the system may sense for a body part proximate to the user interface. A determination may then be made in operation 504 as to whether a body part has been sensed. Operations 502 and 504 may continue to cycle until in operation 504 it is determined that a body part has been sensed proximate to the user interface.

If in operation 504 it is determined that a body part has been sensed, then in operation 506 position data may be generated based on the sensing circuitry determining a position of the body part. A determination may then be made in operation 508 as to whether the position of the body part relative to the user interface (e.g., determined based on the position data generated in operation 506) constitutes an attempt by the user to actuate (e.g., interact with) the user interface. A determination in operation 508 that the position of the body part is not an attempt to actuate the user interface may be followed by a return to operation 502 to continue sensing for a body part. If in operation 508 it is determined that interaction with the user interface was intended, then in operations 510 to 514 directional feedback may be generated. In particular, in operation 510 delays for adjusting the phase of a driving signal (e.g., generated by signal source circuitry) may be determined (e.g., by delay circuitry) corresponding to one or more beam generators (e.g., ultrasonic transducers) to generate a steerable ultrasonic beam having a focal point based on a relative or absolute position determined for the body part. Operation 512 may be optional in that the inclusion of operation 512 may depend on the intended usage, abilities, etc. of the particular implementation. In optional operation 512 the intensity and/or type of beam may be determined. Intensity and/or type (e.g., continuous, pulsed, patterned, etc.) may be determined based on the particular confirmation that is intended to be communicated the user by the directional feedback. Example confirmations may include command recognized, command not recognized, object selected, object deleted, application executed, etc. Tactile feedback such as, for example, an ultrasonic beam may then be generated in operation 514. Operation 514 may then be followed by a return to operation 502 to continue sensing for body parts proximate to the user interface.

While FIG. 5 illustrates operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry.

The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software circuitry executed by a programmable control device.

Thus, this disclosure is directed to a system to provide tactile feedback during non-contact interaction. A system may comprise at least display circuitry, sensing circuitry, tactile feedback circuitry and processing circuitry. The processing circuitry may cause the display circuitry to present a user interface. The sensing circuitry may sense when a body part of a user (e.g., a hand, a finger, etc.) is proximate to the user interface and may generate position data based on a sensed position of the body part. The processing circuitry may determine a relative position of the body part with respect to the user interface based on the position data, and may determine if the body part is interacting with the user interface based on the relative position. If it is determined that the body part is interacting with the user interface, the processing circuitry may cause the tactile feedback circuitry to generate directional feedback.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system to provide tactile feedback during non-contact interaction.

According to example 1 there is provided a device for non-contact user interaction. The device may comprise user interface circuitry including display circuitry to present a user interface, sensing circuitry to detect a body part of a user and generate position data based on a sensed position of the body part and tactile feedback circuitry to generate directional feedback, and processing circuitry to at least cause the display circuitry to present the user interface, determine a position of the body part relative to the user interface based on the position data, determine when the body part is interacting with the user interface based on the relative position of the body part and cause the tactile feedback circuitry to generate the directional feedback based on a determination that the body part is interacting with the user interface.

Example 2 may include the elements of example 1, wherein the directional feedback is contactless feedback transmitted over free space.

Example 3 may include the elements of any of examples 1 to 2, wherein the body part is at least one of a hand or finger of the user.

Example 4 may include the elements of any of examples 1 to 3, wherein the display circuitry is to at least one of cause a display to present the user interface or cause a projector to project a user interface onto a surface.

Example 5 may include the elements of any of examples 1 to 4, wherein the sensing circuitry is to determine coordinates for the body part in at least one of a coordinate system relative to the device or a fixed coordinate system.

Example 6 may include the elements of any of examples 1 to 5, wherein tactile feedback circuitry is to generate a steerable ultrasonic beam directed at the relative position of the body part.

Example 7 may include the elements of any of examples 1 to 6, wherein the tactile feedback circuitry comprises at least signal source circuitry and ultrasonic transducer circuitry including at least one ultrasonic transducer.

Example 8 may include the elements of example 7, wherein the signal source circuitry is to generate a signal for driving the at least one ultrasonic transducer to generate the directional feedback.

Example 9 may include the elements of example 8, wherein the ultrasonic transducer circuitry comprises a plurality of ultrasonic transducers arranged in an array.

Example 10 may include the elements of example 9, wherein the ultrasonic transducer circuitry comprises a plurality of ultrasonic transducers arranged in a multidimensional array.

Example 11 may include the elements of example 10, wherein the multidimensional array is a two-dimensional (2-D) array comprising the plurality of ultrasonic transducers arranged in at least two stacked rows.

Example 12 may include the elements of any of examples 10 to 11, wherein the multidimensional array is a three-dimensional (3-D) array comprising the plurality of ultrasonic transducers arranged in a spherical configuration.

Example 13 may include the elements of any of examples 9 to 12, wherein the delay circuitry is to, for one or more of the plurality of ultrasonic transducers, control an amount of delay introduced into the driving signal.

Example 14 may include the elements of example 13, wherein the delay circuitry is to control an amount of delay introduced into the driving signal for each of the plurality of ultrasonic transducers.

Example 15 may include the elements of any of examples 13 to 14, wherein the delay circuitry is further to, for one or more of the plurality of ultrasonic transducers, control an amplitude levels of the driving signals.

Example 16 may include the elements of any of examples 1 to 15, wherein the processing circuitry is further to determine at least one of an intensity for the direction feedback or a type of for the directional feedback.

Example 17 may include the elements of any of example 16, wherein the types of directional feedback include at least constant feedback and pulsed feedback.

Example 18 may include the elements of any of examples 1 to 17, wherein the processing circuitry is further to determine at least one of an intensity for the direction feedback or a type of for the directional feedback including at least constant feedback and pulsed feedback.

According to example 19 there is provided a method for non-contact user interaction with at least one device. The method may comprise presenting a user interface, detecting a body part of a user, generating position data based on a sensed position of the body part, determining a position of the body part relative to the user interface based on the position data, determining when the body part is interacting with the user interface based on the relative position of the body part and causing the tactile feedback circuitry to generate the directional feedback based on a determination that the body part is interacting with the user interface.

Example 20 may include the elements of example 19, wherein the directional feedback is contactless feedback transmitted over free space.

Example 21 may include the elements of any of examples 19 to 20, wherein presenting a user interface comprises at least one of causing a display within or coupled to the at least one device to present the user interface or causing a projector to project a user interface onto a surface.

Example 22 may include the elements of any of examples 19 to 21, wherein generating position data comprises generating coordinates for the body part in at least one of a coordinate system relative to the at least one device or a fixed coordinate system.

Example 23 may include the elements of any of examples 19 to 22, wherein generating the directional feedback comprises generating a steerable ultrasonic beam directed at the relative position of the body part.

Example 24 may include the elements of any of examples 19 to 23, wherein generating the directional feedback comprises generating a signal for driving at least one ultrasonic transducer.

Example 25 may include the elements of example 24, and may further comprise, for one or more of a plurality of ultrasonic transducers, controlling an amount of delay introduced into the driving signal.

Example 26 may include the elements of example 25, and may further comprise controlling an amount of delay introduced into the driving signal for each of the plurality of ultrasonic transducers.

Example 27 may include the elements of any of examples 25 to 26, and may further comprise, for one or more of the plurality of ultrasonic transducers, further controlling amplitude levels of the driving signals.

Example 28 may include the elements of any of examples 19 to 27, and may further comprise determining at least one of an intensity for the direction feedback or a type of for the directional feedback.

According to example 29 there is provided a system including at least one device, the system being arranged to perform the method of any of the above examples 19 to 28.

According to example 30 there is provided a chipset arranged to perform the method of any of the above examples 19 to 28.

According to example 31 there is provided at least one machine readable medium comprising a plurality of instructions that, in response to be being executed on a computing device, cause the computing device to carry out the method according to any of the above examples 19 to 28.

According to example 32 there is provide at least one device capable non-contact user interaction, the at least one device being arranged to perform the method of any of the above examples 19 to 28.

According to example 33 there is provided a system for non-contact interaction with at least one device. The system may comprise means for presenting a user interface, means for detecting a body part of a user, means for generating position data based on a sensed position of the body part, means for determining a position of the body part relative to the user interface based on the position data, means for determining when the body part is interacting with the user interface based on the relative position of the body part and means for causing the tactile feedback circuitry to generate the directional feedback based on a determination that the body part is interacting with the user interface.

Example 34 may include the elements of example 33, wherein the directional feedback is contactless feedback transmitted over free space.

Example 35 may include the elements of any of examples 33 to 34, wherein the means for presenting a user interface comprise means for at least one of causing a display within or coupled to the at least one device to present the user interface or causing a projector to project a user interface onto a surface.

Example 36 may include the elements of any of examples 33 to 35, wherein the means for generating position data comprise means for generating coordinates for the body part in at least one of a coordinate system relative to the at least one device or a fixed coordinate system.

Example 37 may include the elements of any of examples 33 to 36, wherein the means for generating the directional feedback comprise means for generating a steerable ultrasonic beam directed at the relative position of the body part.

Example 38 may include the elements of any of examples 33 to 37, wherein the means for generating the directional feedback comprise means for generating a signal for driving at least one ultrasonic transducer.

Example 39 may include the elements of example 38, and may further comprise means for, for one or more of a plurality of ultrasonic transducers, controlling an amount of delay introduced into the driving signal.

Example 40 may include the elements of example 39, and may further comprise means for controlling an amount of delay introduced into the driving signal for each of the plurality of ultrasonic transducers.

Example 41 may include the elements of any of examples 39 to 40, and may further comprise means for, for one or more of the plurality of ultrasonic transducers, further controlling amplitude levels of the driving signals.

Example 42 may include the elements of any of examples 33 to 41, and may further comprise means for determining at least one of an intensity for the direction feedback or a type of for the directional feedback.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device for non-contact user interaction, comprising:
    display circuitry to project a user interface that includes one or more objects onto a surface;
    sensing circuitry comprising at least one depth sensing camera configured to detect a respective location of each of a plurality of body parts of a user and to generate position data for each of the plurality of body parts based on a sensed proximity and position of the respective body part;
    tactile feedback circuitry comprising a plurality of ultrasonic transducers forming an ultrasonic transducer array, the ultrasonic transducer array being configured to generate a plurality of steerable ultrasonic beams; and
    processing circuitry to:
        cause the display circuitry to project the user interface on the surface;
        determine a position of each respective one of the plurality of body parts relative to the one or more objects included on the user interface based on the position data associated with each respective one of the plurality of body parts;
        determine when at least one of the plurality of body parts is interacting with the one or more objects included in the user interface based on the relative position of the respective body part with respect to the one or more objects included in the user interface; and
        cause the tactile feedback circuitry to generate the plurality of steerable ultrasonic beams based on a determination that the at least one of the plurality of body parts is interacting with the user interface,
    wherein each of the plurality of steerable ultrasonic beams has an acoustic power level equal to or greater than 0.0686 Watts, and
    wherein each of at least two of the plurality of steerable ultrasonic beams are transmitted from the device through free space and directly to respective focal points within the projected user interface as a confirmation of a recognized gesture being performed with respective ones of at least two of the plurality of body parts via interaction with the one or more objects included in the user interface.

2. The device of claim 1, wherein the sensing circuitry is configured to determine coordinates for each of at least some of the plurality of body parts in at least one of a coordinate system relative to the device or a fixed coordinate system.

3. The device of claim 1, wherein the tactile feedback circuitry comprises at least signal source circuitry and ultrasonic transducer circuitry comprising the ultrasonic transducer array of the plurality of ultrasonic transducers.

4. The device of claim 3, wherein the signal source circuitry is configured to generate at least one driving signal for driving at least one ultrasonic transducer within the ultrasonic transducer array to generate the ultrasonic beam.

5. The device of claim 4, wherein the ultrasonic transducer array is a multidimensional array.

6. The device of claim 4, further comprising:
    delay circuitry configured to control an amount of delay introduced into the at least one driving signal.

7. The device of claim 1, wherein the processing circuitry is further configured to determine at least one of an intensity or a type for the ultrasonic beam.

8. The device of claim 7, wherein the types of ultrasonic beams include at least constant feedback and pulsed feedback.

9. A method for non-contact user interaction with at least one device, comprising:
    projecting, by display circuitry, a user interface that includes one or more objects onto a surface;
    detecting, by sensing circuitry comprising at least one depth sensing camera, a respective location of each of a plurality of body parts of a user;
    generating, by the sensing circuitry, position data for each of the plurality of body parts based on a sensed proximity and position of the respective body part;
    determining, by processing circuitry, a position of each of the plurality of body parts relative to the one or more objects included on the user interface based on the position data associated with each respective one of the plurality of body parts;
    determining, by the processing circuitry, when at least one of the plurality of body parts is interacting with the one or more objects included on the user interface based on the relative position of the respective body part with respect to the one or more objects included in the user interface; and
    causing, by the processing circuitry, tactile feedback circuitry comprising a plurality of ultrasonic transducers forming an ultrasonic transducer array to generate a plurality of steerable ultrasonic beams based on a determination that the at least one of the plurality of body parts is interacting with at least one of the one or more objects included on the user interface,
    wherein each of the plurality of steerable ultrasonic beams has an acoustic power level equal to or greater than 0.0686 Watts, and wherein each of at least two of the plurality of steerable ultrasonic beams are transmitted from the device through free space and directly to respective focal points within the projected user interface as a confirmation of a recognized gesture being performed with respective ones of at least two of the plurality of body parts via interaction with the one or more objects included in the user interface.

10. The method of claim 9, wherein generating the position data comprises generating coordinates for each of at least some of the plurality of body parts in at least one of a coordinate system relative to the at least one device or a fixed coordinate system.

11. The method of claim 9, wherein generating the ultrasonic beam comprises generating at least one driving signal for driving at least one ultrasonic transducer within the ultrasonic transducer array.

12. The method of claim 11, further comprising:
controlling an amount of delay introduced into the at least one driving signal.

13. The method of claim 9, further comprising:
determining at least one of an intensity or a type for the ultrasonic beam.

14. At least one non-transitory machine-readable storage medium having stored thereon instructions for non-contact interaction with at least one device that, when executed by one or more processors, cause the one or more processors to:
cause display circuitry to project a user interface that includes one or more objects onto a surface;
cause sensing circuitry comprising at least one depth sensing camera to detect a respective location of each of a plurality of body parts of a user;
cause the sensing circuitry to generate position data for each of the plurality of body parts based on a sensed proximity and position of the respective body part;
determine a position of each of the plurality of body parts relative to the one or more objects included on the user interface based on the position data associated with each respective one of the plurality of body parts;
determine when at least one of the plurality of body parts is interacting with the one or more objects included on the user interface based on the relative position of the respective body part with respect to the one or more objects included in the user interface; and
cause tactile feedback circuitry comprising a plurality of ultrasonic transducers forming an ultrasonic transducer array to generate a plurality of steerable ultrasonic beams based on a determination that the at least one of the plurality of body parts is interacting with at least one of the one or more objects included on the user interface,
wherein each of the plurality of steerable ultrasonic beams has an acoustic power level equal to or greater than 0.0686 Watts, and
wherein each of at least two of the plurality of steerable ultrasonic beams are transmitted from the at least one device through free space and directly to respective focal points within the projected user interface as a confirmation of a recognized gesture being performed with respective ones of at least two of the plurality of body parts via interaction with the one or more objects included in the user interface.

15. The storage medium of claim 14, wherein the instructions to cause the sensing circuitry to generate position data comprise instructions to generate coordinates for each of at least some of the plurality of body parts in at least one of a coordinate system relative to the at least one device or a fixed coordinate system.

16. The storage medium of claim 14, wherein the instructions to cause the tactile feedback circuitry to generate the ultrasonic beam comprise instructions to generate at least one driving signal for driving at least one ultrasonic transducer within the ultrasonic transducer array.

17. The storage medium of claim 16, further comprising instructions that, when executed by one or more processors, cause the one or more processors to:
control an amount of delay introduced into the at least one driving signal.

18. The storage medium of claim 14, further comprising instructions that, when executed by one or more processors, cause the one or more processors to:
determine at least one of an intensity or a type for the ultrasonic beam.

* * * * *